E. & J. C. DALTON.
RAKE.
APPLICATION FILED JULY 3, 1916.
1,253,355.
Patented Jan. 15, 1918.
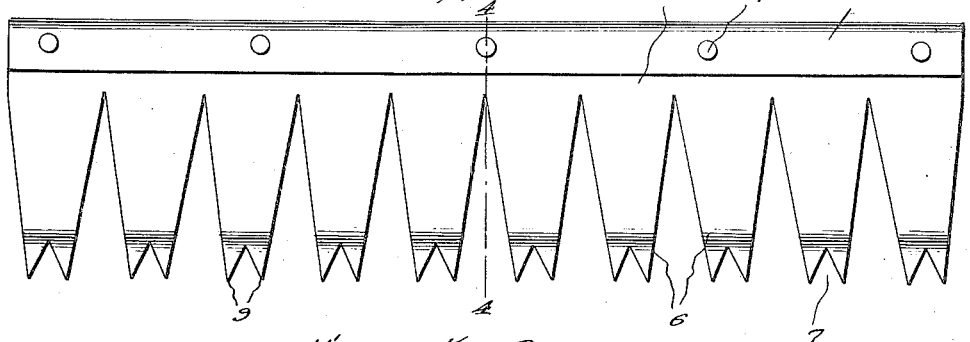
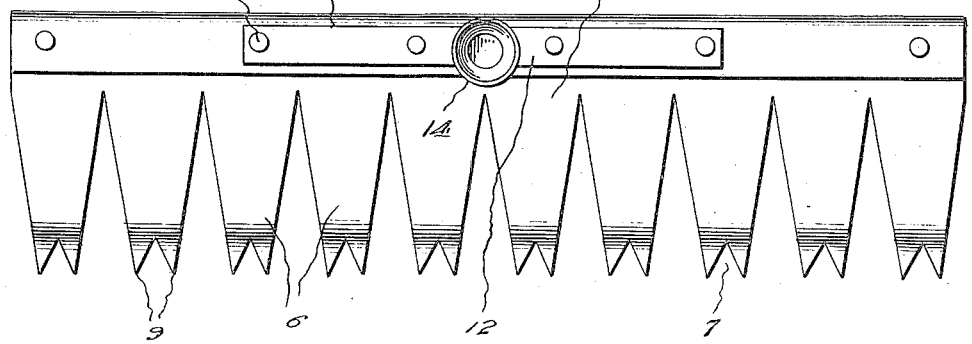
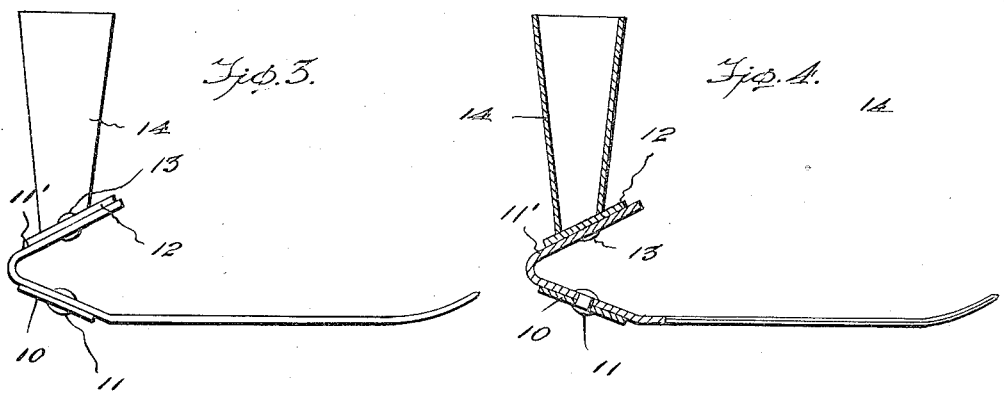
Witness
J. M. Hunt.
N. A. Munnett
Inventors
Edward Dalton
James C. Dalton.
By John Louis Waters & Co.
Attorney

UNITED STATES PATENT OFFICE.

EDWARD DALTON, OF BALDWINSVILLE, AND JAMES C. DALTON, OF NEW YORK, N. Y.

RAKE.

1,253,355.  Specification of Letters Patent.  Patented Jan. 15, 1918.

Application filed July 3, 1916. Serial No. 107,347.

*To all whom it may concern:*

Be it known that we, EDWARD DALTON and JAMES C. DALTON, citizens of the United States, said EDWARD DALTON residing at Baldwinsville, in the county of Onondaga and State of New York, and said JAMES C. DALTON residing at New York, in the county and State of New York, have invented certain useful Improvements in Rakes, of which the following is a specification, reference being had therein to the accompanying drawing.

Our invention relates to improvements in rakes, one object of the invention being the provision of a rake, the teeth of which are so constructed as to remove by cutting from the lawn, coarser growths, such as weeds and dandelions, without injuring the grass.

A further object of our invention is the provision of a rake of this type, the teeth of which are cut from a single sheet of metal and are each provided with a peculiar cutting edge whereby growths that are not cut or removed by a lawn mower may be cut upon the forward stroke of the rake to be released upon the rear stroke thereof.

A still further object of this invention is the provision of a rake of this type which is simple, durable and inexpensive in construction, and thoroughly efficient and practical in use.

In the accompanying drawings:—

Figure 1 is a front elevation of the complete head of the rake.

Fig. 2 is a rear elevation thereof.

Fig. 3 is a side view thereof.

Fig. 4 is a section taken on line 4—4 of Fig. 1.

Referring to the drawings, the numeral 5 designates the head proper which is made from a single sheet of metal and has stamped or otherwise formed upon one edge thereof the teeth 6, the sides of which are arranged in convergent relation with each other. Each tooth is inclined inwardly adjacent the outer end and is provided with the substantially V-shaped notch 7 the edges of which are sharpened to consequently provide two gathering and cutting auxiliary teeth 9.

The portion of the head adjacent to the bases of the main teeth is reinforced by means of the strip 10 of metal secured by rivets 11 thereto. Thus rigidity is imparted to the rake head. The inner portion of the head is bent upon itself as at 11' and is also provided with the handle attaching reinforcement 12 which is attached thereto by means of the rivets 13, the handle receiving ferrule or socket 14 being carried thereby so that the usual form of rake handle may be attached thereto in position.

It will be noted that the teeth of this rake are set at a peculiar angle relatively to the body so that when the rake is pulled over the ground, the inclined ends of the teeth 6, having the V-shaped notches therein, which provide the auxiliary teeth, will ride upon the ground and will not dig and thus injure the grass, but on the other hand will cause the coarser growths to enter the small V-shaped notches thereof so that such growths will be cut or severed and carried by the main portion of the rake teeth which act in the usual manner, the reverse movement of the rake readily cleaning or removing the cut growth therefrom, so that upon the next forward movement, there will be no stoppage of the teeth.

What we claim as new is:—

1. A device of the kind described consisting of a metallic head, said head being formed with a longitudinally spaced apart series of integral teeth, each of said teeth having oppositely inclined edges, each of said teeth also being formed with a V-shaped notch so as to provide two points upon each tooth, the portions of said teeth formed with said V-shaped notches being bent at a forward angle so as to curve around the tooth, the main body portion of each tooth being straight and flat, and a handle secured substantially at right angles to the plane of said head.

2. A device of the kind described consisting of a head, a handle provided with a reinforcing plate disposed diagonally of said handle, said head being provided with a longitudinal series of similarly shaped teeth formed straight and flat and having a longitudinal portion substantially V-shaped in cross section and disposed in such a manner that one side of the said V-shaped base portion slopes at an angle with respect to said teeth in one direction and the other portion thereof is secured to the reinforcing plate of said handle, said teeth being provided with terminal V-shaped forwardly projecting notches adapted to form a pair of points thereupon.

In testimony whereof we affix our signatures.

EDWARD DALTON.
JAMES C. DALTON.